United States Patent
Schaede

(10) Patent No.: US 10,654,256 B2
(45) Date of Patent: May 19, 2020

(54) CREATION OF A TRANSPARENT POLYMER WINDOW WITH A FIELD OF LENSES IN A SECURITY PAPER SUBSTRATE

(71) Applicant: KBA-NotaSys SA, Lausanne (CH)

(72) Inventor: Johannes Georg Schaede, Würzburg (DE)

(73) Assignee: KBA-NotaSys SA, Lausanne (CH)

( * ) Notice: Subject to any disclaimer, the term of this patent is extended or adjusted under 35 U.S.C. 154(b) by 771 days.

(21) Appl. No.: 14/911,975

(22) PCT Filed: Aug. 8, 2014

(86) PCT No.: PCT/IB2014/063806
§ 371 (c)(1),
(2) Date: Feb. 12, 2016

(87) PCT Pub. No.: WO2015/022612
PCT Pub. Date: Feb. 19, 2015

(65) Prior Publication Data
US 2016/0200088 A1 Jul. 14, 2016

(30) Foreign Application Priority Data

Aug. 14, 2013 (EP) .................................... 13180397

(51) Int. Cl.
*B32B 37/18* (2006.01)
*B32B 3/14* (2006.01)
(Continued)

(52) U.S. Cl.
CPC ............ *B32B 37/18* (2013.01); *B29C 39/003* (2013.01); *B29C 39/10* (2013.01); *B29C 69/001* (2013.01);
(Continued)

(58) Field of Classification Search
CPC .......... B42D 25/29; B42D 25/30; B32B 37/18
See application file for complete search history.

(56) References Cited

U.S. PATENT DOCUMENTS 5,671,671 A 9/1997 Wyssmann et al.
7,922,858 B2 4/2011 Eitel et al.
(Continued)

FOREIGN PATENT DOCUMENTS

CA 2 774 819 A1 4/2011
DE 10 2004 026 050 A1 12/2005
(Continued)

*Primary Examiner* — Philip C Tucker
*Assistant Examiner* — John Blades
(74) *Attorney, Agent, or Firm* — Nixon & Vanderhye P.C.

(57) ABSTRACT

There is described a method of creating a transparent polymer window (W) with a field of lenses (L) in a security paper substrate (1), the method comprising the steps of (i) providing a security paper substrate (1), (ii) forming an opening (10) into the security paper substrate (1), (iii) laminating a transparent film (5; 5*) onto a first side (I) of the security paper substrate (1) in such a way as to close the opening (10) at one end, and (iv) filling the opening (10) with transparent polymer material (2). In one embodiment, the transparent film (5) comprises a field of lenses (L) and is laminated onto the first side (I) of the security paper substrate (1) in such a way as to form lenses (L) on the first side (I) of the security paper substrate (1) in register with the opening (10). In another embodiment, the field of lenses (L) is replicated into the transparent polymer material (2) applied in the opening (10) in such a way as to form lenses (L) on a second side (II) of the security paper substrate (1), opposite to the first side (I), in register with the opening (10). Also described is a device designed to fill the opening (10) formed into the security paper substrate (1) with the transparent polymer material (2) and a processing machine comprising the same.

6 Claims, 7 Drawing Sheets

(51) Int. Cl.
| | |
|---|---|
| *B32B 9/06* | (2006.01) |
| *B32B 38/00* | (2006.01) |
| *B29D 11/00* | (2006.01) |
| *B29C 39/00* | (2006.01) |
| *B29C 39/10* | (2006.01) |
| *B29C 69/00* | (2006.01) |
| *B32B 38/06* | (2006.01) |
| *D21H 25/06* | (2006.01) |
| *B32B 38/04* | (2006.01) |
| *B42D 25/29* | (2014.01) |
| *B42D 25/425* | (2014.01) |
| *B42D 25/351* | (2014.01) |
| *D21H 21/40* | (2006.01) |
| *B42D 25/324* | (2014.01) |
| *B41F 15/08* | (2006.01) |
| *B42D 25/46* | (2014.01) |
| *B42D 25/475* | (2014.01) |
| *B29K 711/12* | (2006.01) |
| *B29L 17/00* | (2006.01) |
| *B41M 3/14* | (2006.01) |

(52) U.S. Cl.
CPC .......... *B29D 11/00442* (2013.01); *B32B 3/14* (2013.01); *B32B 9/06* (2013.01); *B32B 38/0004* (2013.01); *B32B 38/04* (2013.01); *B32B 38/06* (2013.01); *B41F 15/0836* (2013.01); *B42D 25/29* (2014.10); *B42D 25/324* (2014.10); *B42D 25/351* (2014.10); *B42D 25/425* (2014.10); *B42D 25/46* (2014.10); *B42D 25/475* (2014.10); *D21H 21/40* (2013.01); *D21H 25/06* (2013.01); *B29K 2711/12* (2013.01); *B29K 2995/0026* (2013.01); *B29L 2017/00* (2013.01); *B32B 2038/042* (2013.01); *B32B 2250/02* (2013.01); *B32B 2305/347* (2013.01); *B32B 2307/412* (2013.01); *B32B 2317/12* (2013.01); *B32B 2554/00* (2013.01); *B41M 3/14* (2013.01)

(56) References Cited

U.S. PATENT DOCUMENTS

| | | | |
|---|---|---|---|
| 8,636,047 | B2 | 1/2014 | Eitel et al. |
| 8,696,856 | B2 | 4/2014 | Eitel et al. |
| 8,967,221 | B2 | 3/2015 | Eitel et al. |
| 2006/0236877 | A1 | 10/2006 | Strand et al. |
| 2010/0024511 | A1 | 2/2010 | Eitel et al. |
| 2010/0236432 | A1* | 9/2010 | Foresti ............... B41F 9/021 101/167 |
| 2011/0017393 | A1 | 1/2011 | Eitel et al. |
| 2011/0139362 | A1 | 6/2011 | Eitel et al. |
| 2011/0259513 | A1 | 10/2011 | Eitel et al. |

FOREIGN PATENT DOCUMENTS

| | | |
|---|---|---|
| DE | 10 2009 048 145 A1 | 4/2011 |
| DE | 10 2011 108 477 A1 | 1/2013 |
| EP | 0 723 864 A1 | 7/1996 |
| WO | 2005/116335 A1 | 12/2005 |
| WO | 2008/104904 A1 | 9/2008 |
| WO | 2009/112989 A1 | 9/2009 |
| WO | 2010/001317 A1 | 1/2010 |
| WO | 2013/013807 A1 | 1/2013 |

* cited by examiner

CREATION OF A TRANSPARENT POLYMER WINDOW WITH A FIELD OF LENSES IN A SECURITY PAPER SUBSTRATE

This application is the U.S. national phase of International Application No. PCT/IB2014/063806 filed 8 Aug. 2014, which designated the U.S. and claims priority to EP Patent Application No. 13180397.5 filed 14 Aug. 2013, the entire contents of each of which are hereby incorporated by reference.

TECHNICAL FIELD

The present invention generally relates to the creation of a transparent polymer window with a field of lenses in a security paper substrate.

BACKGROUND OF THE INVENTION

The lamination of transparent films onto a side of a security paper substrate is known from International (PCT) Publications Nos. WO 2008/104904 A1, WO 2009/112989 A1 and WO 2010/001317 A1 in the name of the present Applicant, which publications are all incorporated herein by reference in their entirety.

Further improvements of these known solutions are required, especially with a view to create a transparent polymer window with a field of lenses in the security paper substrate.

SUMMARY OF THE INVENTION

A general aim of the invention is therefore to improve the solutions of the prior art.

More specifically, an aim of the present invention is to provide such a solution that can suitably allow for the creation of a transparent polymer window with a field of lenses in a security paper substrate.

These aims are achieved thanks to the solutions disclosed herein. In particular, a method of creating a transparent polymer window with a field of lenses in a security paper substrate may include providing a security paper substrate, forming an opening into the security paper substrate, laminating a transparent film which comprises a field of lenses onto a first side of the security paper substrate in such a way as to close the opening at one end and form lenses on the first side of the security paper substarte in register with the opening, and filling the opening with transparent polymer material.

Another method of creating a transparent polymer window with a field of lenses in a security paper substrate may include providing a security paper substrate, forming an opening into the security paper substrate, laminating a transparent film onto a first side of the security paper substrate in such a way as to close the opening at one end, filling the opening with transparent polymer material, and replicating a field of lenses into the transparent polymer material applied in the opening in such a way as to form lenses on a second side of the security paper substrate, opposite to the first side, in register with the opening.

Advantageous embodiments of the above methods may include any of the following features. The opening may be formed by punching a hole into the security paper substrate or by cutting a hole into the security paper substrate. The opening may be formed by means of a mechanical cutting tool. The opening may be formed by means of a laser beam. The transparent polymer material may be a UV-curable polymer material. The UV-curable polymer material may be cured from a second side of the security paper substrate, opposite to the first side. The UV-curable polymer material may be cured from the first side of the security paper substrate, through the transparent film. The UV-curable polymer material may be cured during the replicating step, while the second side of the security paper substrate is in a contact with a surface of a lens replicating medium. The transparent polymer material may be applied by means of a least one application unit. The transparent polymer material may be applied by means of one or more screen-printing units acting as the least one applicantion unit.

There is also a system designed to fill an opening formed into a security paper substrate with transparent polymer material, which opening is closed at one end by a transparent film that is laminated onto a first side of the security paper substrate, the features of which device may include a transparent film, a security paper substrate having an opening, and a device designed to fill the opening in the security paper substrate with a transparent polymer material. The opening may be closed at one end by the transparent film that is laminated onto a first side of the security paper substrate. The device may include an application system, which may include a first cylinder supporting the first side of the security paper substrate, at least a first application unit cooperating with a second side of the security paper substrate, opposite to the first side, to apply the transparent polymer material into the opening while the security paper substrate is being supported by the first cylinder, and a second cylinder, and a second cylinder located downstream of the first cylinder, which second cylinder cooperates with the second side of the security paper substrate and carries on its circumference a lens replicating medium designed to replicate a field of lenses into the transparent polymer material applied in the opening in such a way as to form lenses on the second side of the security paper substrate in register with the opening. The transparent polymer material may be a UV-capable polymer material. The device may further comprise a UV-curing unit cooperating with the second cylinder in order to cure the UV-curable polymer material from the first side of the security paper substrate, through the transparent film. The device may function to fill the opening in the security paper substrate with the transparent polymer material.

Advantageous embodiments of the above methods may include any of the following features. The device may further comprise a pressure roller cooperating with the first side of the security paper substrate and pressing the security paper substrate against the circumference of the second cylinder. The application system of the device may further include at least a second application unit cooperating with the second side of the security paper substrate to apply the transparent polymer material into the opening while the security paper substrate is being supported by the first cylinder. Each of the first and second application units may apply a portion of the transparent polymer material necessary to fill the opening. The transparent polymer material may be a UV-curable polymer material, and the device may further comprise at least one intermediate UV-curing unit located between the at least first and second application units. Each application unit may be a screen-printing unit There is also a processing machine comprising (i) a laminating system designed to laminate a transparent film onto a first side of the security paper substrate in such a way as to close one end of an opening formed into a security paper substrate and (ii) a device in accordance with the embodiments disclosed above to fill the opening with transparent polymer material.

Further advantageous embodiments of the invention are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

The present invention will be described in the particular context of the creation of transparent polymer windows into security paper substrates which are provided in the form of successive sheets, the security paper substrates being provided with an opening which is closed at one end by a transparent film that is laminated onto a first side of the security paper substrate.

As such, the formation of transparent windows by punching or cutting a hole (for instance by laser cutting) into security paper sheets followed by the lamination of a transparent film onto a first side of the security paper sheets so as to close one end of the opening is known from International (PCT) Publications Nos. WO 2008/104904 A1, WO 2009/112989 A1 and WO 2010/001317 A1 in the name of the present Applicant, which publications are all incorporated herein by reference in their entirety. Such a solution is sold by the Applicant under the trademarks OptiNota® H and OptiWindows®.

This process is schematically illustrated by FIGS. 1A-C and 2A-C in the context of two distinct embodiments of the invention.

Figure 1A:
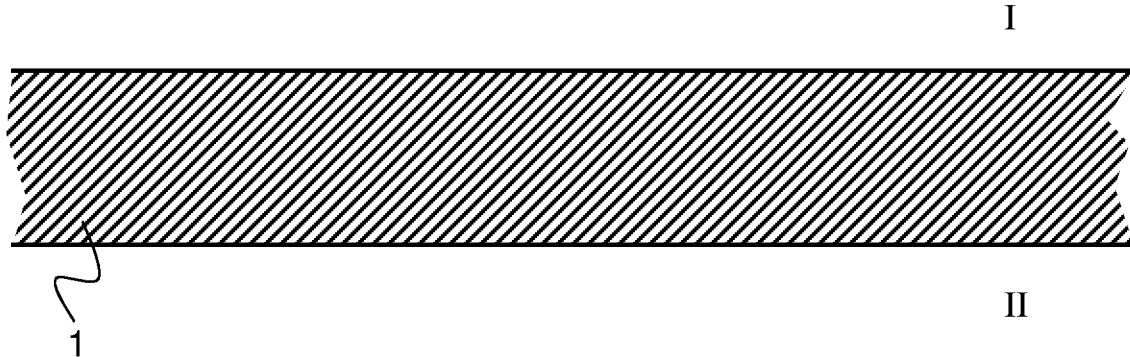
FIGS. 1A-D are schematic sectional views illustrating successive steps of an embodiment of a method of creating a transparent polymer window with a field of lenses in a security paper substrate in accordance with a first embodiment of the invention.
Figure 1B:
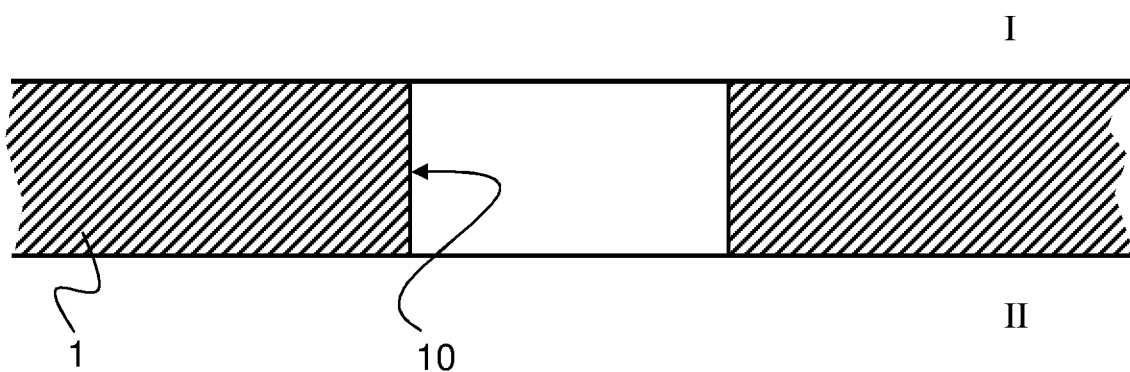
Figure 1C:
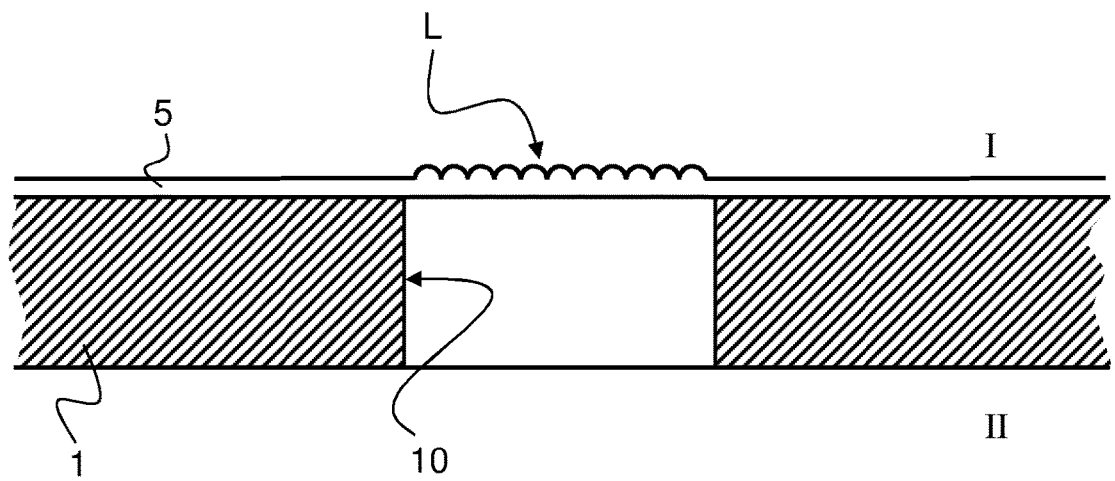
Figure 1D:
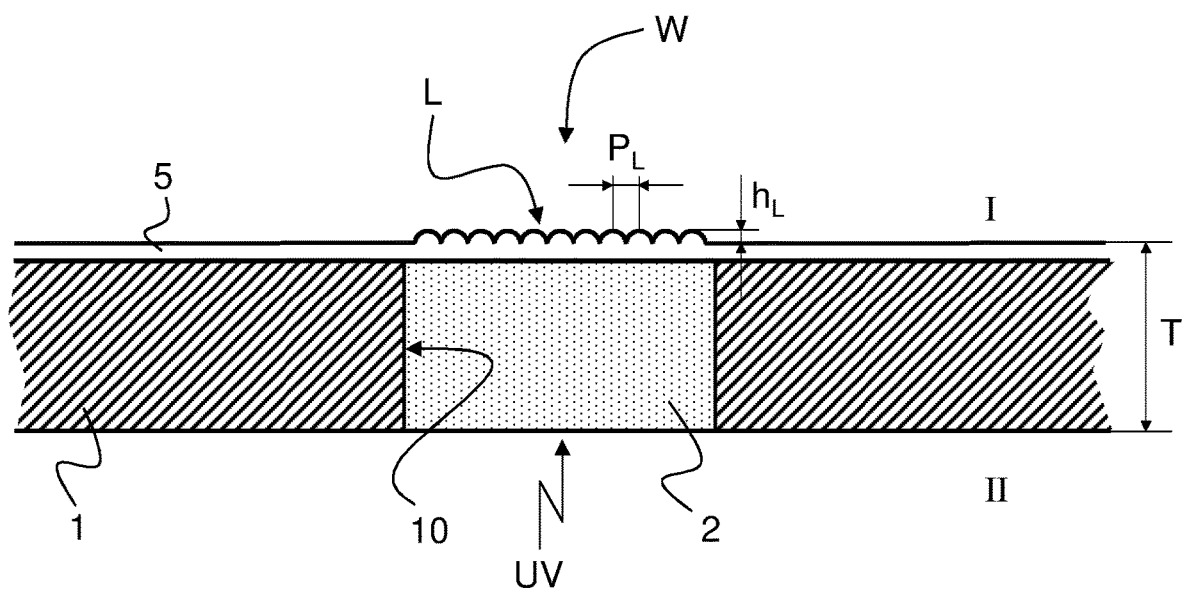

In accordance with a first embodiment of the invention as illustrated by FIGS. 1A-D, the security paper substrate 1 is first provided with an opening 10, namely a through-hole. This can be performed by punching or cutting (for instance by means of a suitable mechanical cutting tool or by means of a laser beam) a hole through the thickness of the security paper substrate 1. This opening 10 can exhibit any desired shape and/or dimensions. The opening 10 is then closed at one end by a transparent film 5 that is laminated onto a first side I of the security paper substrate 1 as illustrated by FIG. 1C, which lamination can be performed according to the principle taught by International (PCT) Publications Nos. WO 2008/104904 A1, WO 2009/112989 A1 and WO 2010/001317 A1.

According to this first embodiment, the transparent film 5 is already provided with a field of lenses L and the transparent film 5 is laminated in such a way as to close the opening 10 and form the lenses L on the first side I of the security paper substrate 1 in register with the opening 10. The lenses L can exhibit any desired shape and may for instance consist of a parallel arrangement of semi-cylindrical lenses or a two-dimensional array of individual lens elements, such as hemispherical or hexagonal lenses.

Subsequent to the lamination of the transparent film 5, the opening 10 is filled with transparent polymer material 2. This transparent polymer material 2 is preferably a UV-curable polymer material which is cured by UV radiation, in this first embodiment, from a second side II of the security paper substrate 1, opposite to the first side I.

As a result of the filling of the opening 10 with the transparent polymer material 2 there is formed a transparent polymer window W in the security paper substrate which exhibits a thickness T (including the lenses L) in the order of magnitude of the thickness of the security paper substrate 1. The security paper substrate 1 thus provided with the transparent polymer window W can suitably be printed on the second side II with patterns, in register with the lenses L, so as to interact with the lenses L and form an optically-variable security feature that is observable through the window W and lenses L, from the first side I of the security paper substrate 1.

Figure 2A:
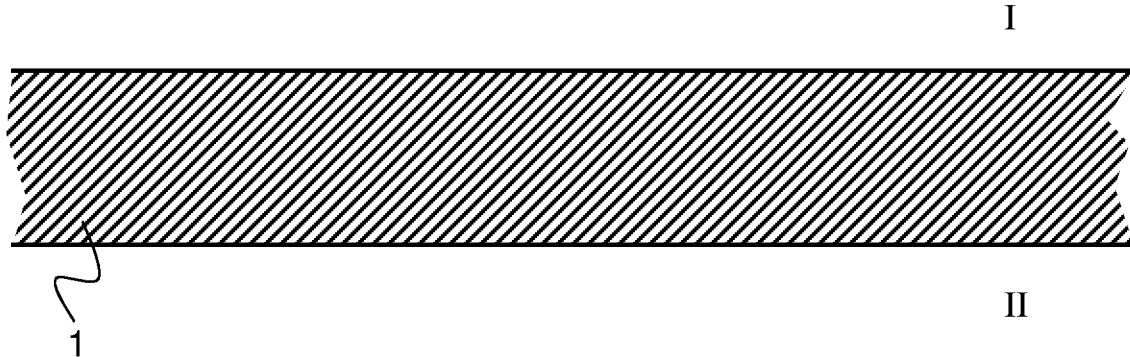
FIGS. 2A-E are schematic sectional views illustrating successive steps of an embodiment of a method of creating a transparent polymer window with a field of lenses in a security paper substrate in accordance with a second embodiment of the invention.
Figure 2B:
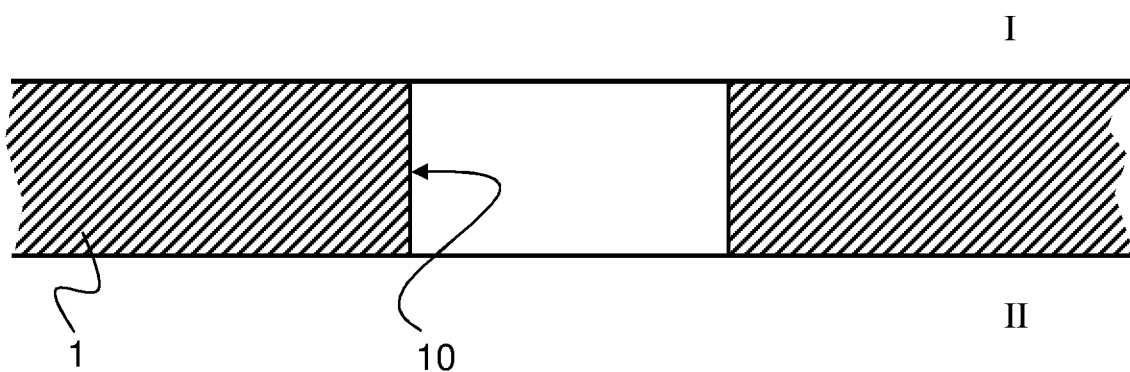
Figure 2C:
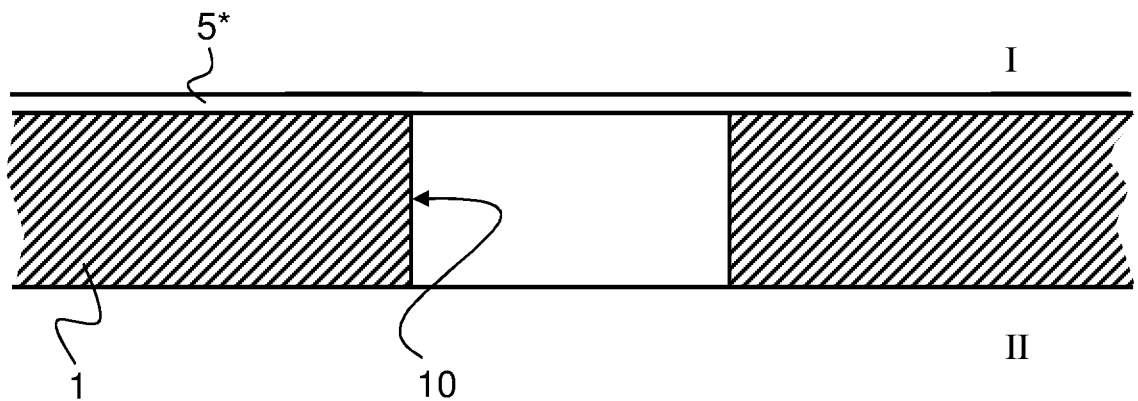

FIGS. 2A-E illustrate a second embodiment of the invention wherein the security paper substrate 1 is first provided, like in the first embodiment, with an opening 10 (FIG. 2B) which is then closed at one end by a transparent film 5* that is laminated onto a first side I of the security paper substrate 1 (FIG. 2C). In contrast to the first embodiment, the transparent film 5* is not provided with any lenses L.

Subsequent to the lamination of the transparent film 5*, the opening 10 is likewise filled with transparent polymer material 2. In contrast to the first embodiment, the transparent polymer material 2 is subjected to a further processing step as illustrated by FIG. 2D which consists in the replication of a field of lenses L into the transparent polymer material 2 applied in the opening 10 in such a way as to form lenses L on a second side II of the security paper substrate 1, opposite to the first side I, in register with the opening 10.

Figure 2D:
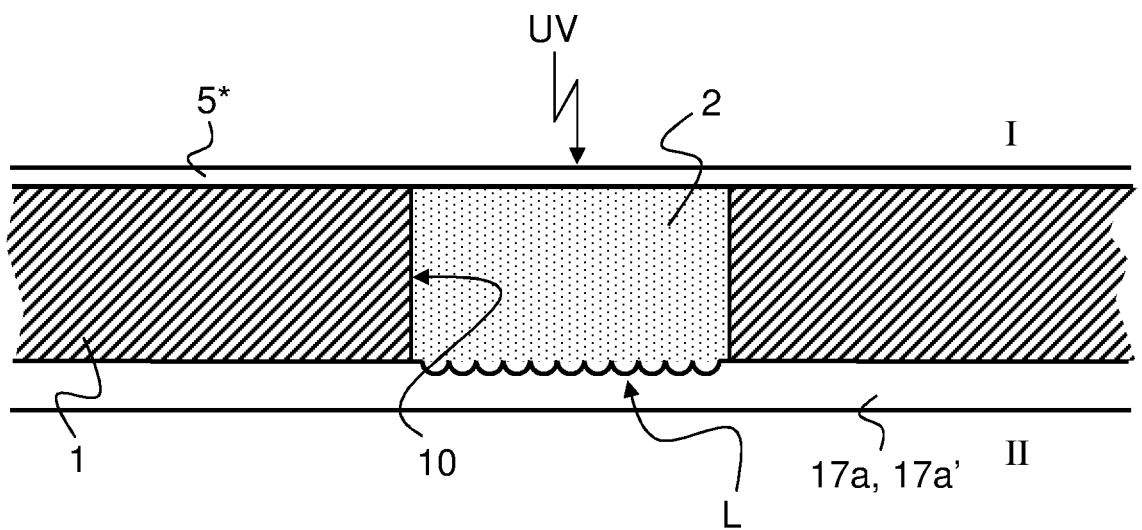
Figure 2E:
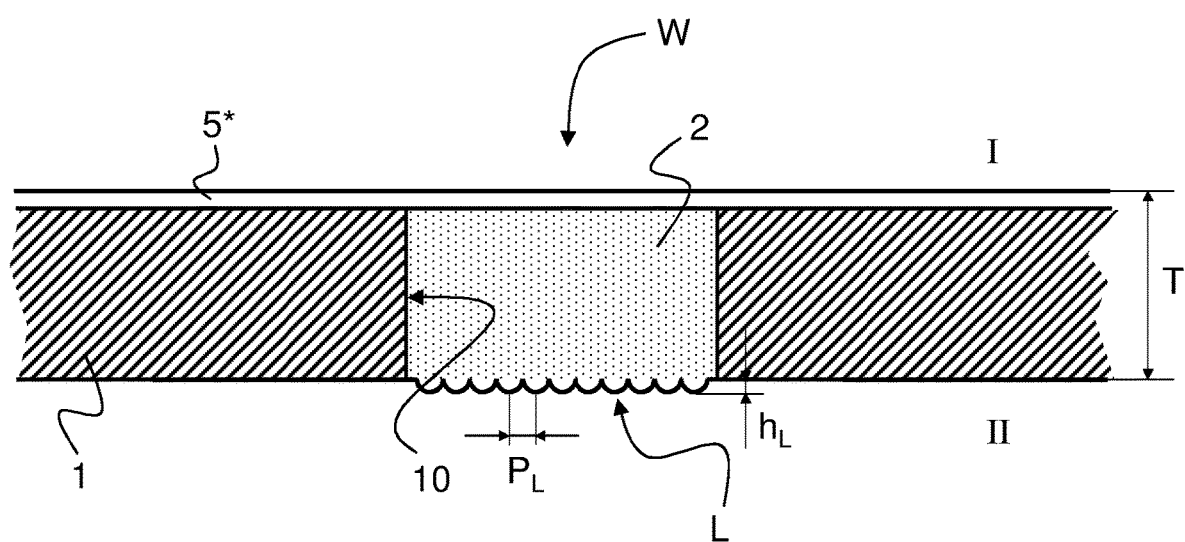

The replication of the lenses L into the transparent polymer material 2 is preferably carried out by pressing the second side of the security paper substrate 1, in the area of the transparent polymer material 2, against a lens replicating medium which is schematically illustrated in FIG. 2D and designated by reference numeral 17a, respectively 17a'. This lens replicating medium 17a, 17a' can in particular take the shape of a suitable plate provided with a corresponding recessed area (or alternatively a relief area) structured to form the lenses in the transparent polymer material 2.

Like in the first embodiment, the transparent polymer material 2 is preferably a UV-curable polymer material. In this other embodiment, the transparent polymer material 2 is however preferably cured by UV radiation from the first side I of the security paper substrate 1 through the transparent film 5*, while the security paper substrate 1 is in contact with a surface of the lens replicating medium 17a, 17a' (see FIG. 2D).

As a result of the filling of the opening 10 with the transparent polymer material 2 there is formed a transparent polymer window W in the security paper substrate which exhibits a thickness T (including the lenses L) in the order of magnitude of the thickness of the security paper substrate 1. In contrast to the first embodiment, the lenses L are formed on the second side II of the security paper substrate 1. The security paper substrate 1 thus provided with the transparent polymer window W can suitably be printed on the first side I with patterns, in register with the lenses L, so as to interact with the lenses L and form an optically-variable security feature that is observable through the window W and lenses L, from the second side II of the security paper substrate 1

As this will be appreciated hereinafter, the transparent polymer material 2 is preferably applied by screen-printing using one or more screen-printing units as application unit(s). More than one application units may be necessary in order to suitably apply transparent polymer material 2 in a quantity sufficient to fill the opening 10.

The lenses L preferably have a lens pitch $P_L$ of the order of 10 to 50 μm and has a lens height $h_L$ of the order of 10 to 20 μm. In comparison, the overall thickness T of the security paper substrate is of the order of 60 to 120 μm.

Figure 3:
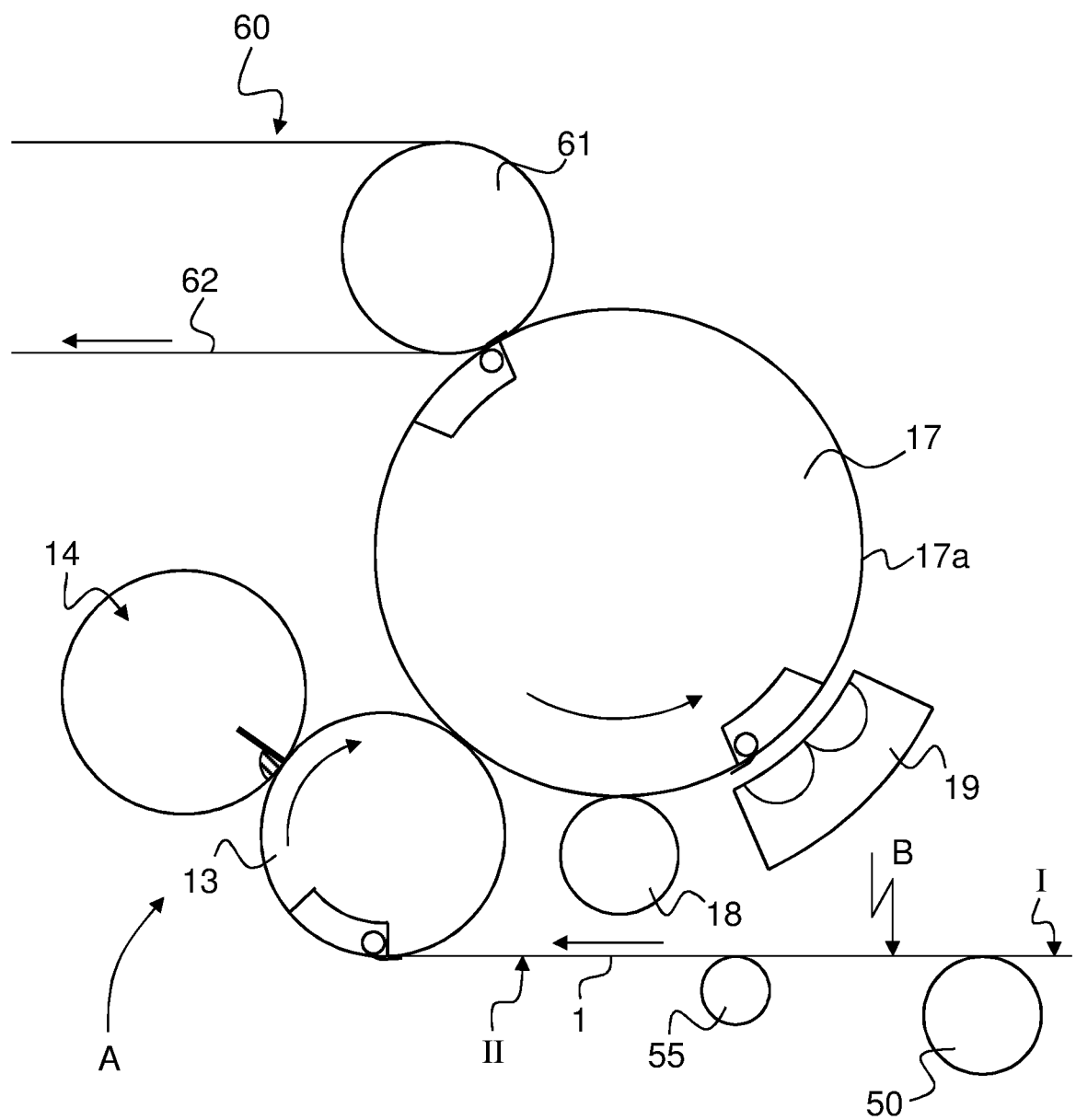
FIG. 3 is a schematic side view of a device designed to fill an opening formed into a security paper substrate with transparent polymer material, which opening is closed at one end by a transparent film that is laminated onto a first side of the security paper, in accordance with a first variant of the invention.

FIG. 3 is illustrative of a first variant of a device designed to fill the opening 10 formed into the security paper substrate 1 with transparent polymer material 2. This device can suitably be located downstream of a laminating system (not shown)—such as discussed e.g. in International (PCT) Publication No. WO 2008/104904 A1—that is designed to laminate the transparent film 5, respectively 5*, onto the first side I of the security paper substrate 1 in such a way as to close one end of the opening 10 formed in the security paper substrate 1 as discussed above.

The device of FIG. 3 is in particular designed to be located after cutting of the laminated film 5, respectively 5*, which is preferably cut by means of a laser beam designated schematically by reference B in FIG. 3. Cutting of the laminated film is preferably carried out in accordance with the teaching of International (PCT) Publication No. WO 2010/001317 A1. Reference numeral 50 in FIG. 3 schematically illustrates an output of the laminating system (upstream of the location where the laminated film 5, respectively 5*, is cut), while reference numeral 55 schematically illustrates an accelerating drum used to separate the sheets prior to applying the transparent polymer material 2.

In the context of FIG. 3, the security paper substrate 1 is transferred to an application system A comprising a first cylinder 13 which supports the first side I of the security paper substrate 1. This application system A further comprises a first application unit 14 designed to cooperate with the first cylinder 13 and the second side II of the security paper substrate 1 in order to apply the transparent polymer material 2 in the opening 10 formed in the security paper substrate 1. This application unit 14 is preferably designed as a screen-printing unit. A suitable screen-printing unit is for instance disclosed in European Patent Publication No. EP 0 723 864 A1 in the name of the present Applicant, which is incorporated herein by reference in its entirety.

Downstream of the first cylinder 13, there is preferably provided a second cylinder 17 which cooperates with the second side II of the security paper substrate 1. This second cylinder 17 carries on its circumference a lens replicating medium 17a (as schematically illustrated in FIG. 2D) designed to replicate a field of lenses L into the transparent polymer material 2 applied in the opening 10 as discussed above. The application unit 14 may be adapted to supply a slight excess of transparent polymer material 2 sufficient to fill the recessed portion of the lens replicating medium 17a.

A pressure roller 18 is advantageously further provided in order to cooperate with the first side I of the security paper substrate 1 and press the security paper substrate 1 against the circumference of the second cylinder 17, thereby ensuring proper replication of the lenses L into the transparent polymer material 2.

The device further comprises a UV-curing unit 19 cooperating with the second cylinder 17 in order to cure the UV-curable polymer material 2 from the first side I of the security paper substrate 1, through the transparent film, while the security paper substrate 1 is in contact with the lens replicating medium 17a.

Subsequent to the replication of the lenses L, the security paper substrate 1 is transferred to a suitable sheet gripper system 60 comprising, as is conventional in the art, a pair of endless chains 62 carrying spaced-apart gripper bars, which endless chains 62 are driven into rotation between pairs of chain wheels, one pair being illustrated in FIG. 3 and designated by reference numeral 61.

The second cylinder 17 with its lens replicating medium 17a may be omitted in case of formation of the transparent polymer window W in accordance with the first embodiment illustrated by FIGS. 1A-D. In such a case, it would be appropriate to provide the UV-curing 19 in such a way as to be associated with the first cylinder 13 and cure the UV-curable polymer material 2 from the second side II of the security paper substrate 1.

Figure 4:
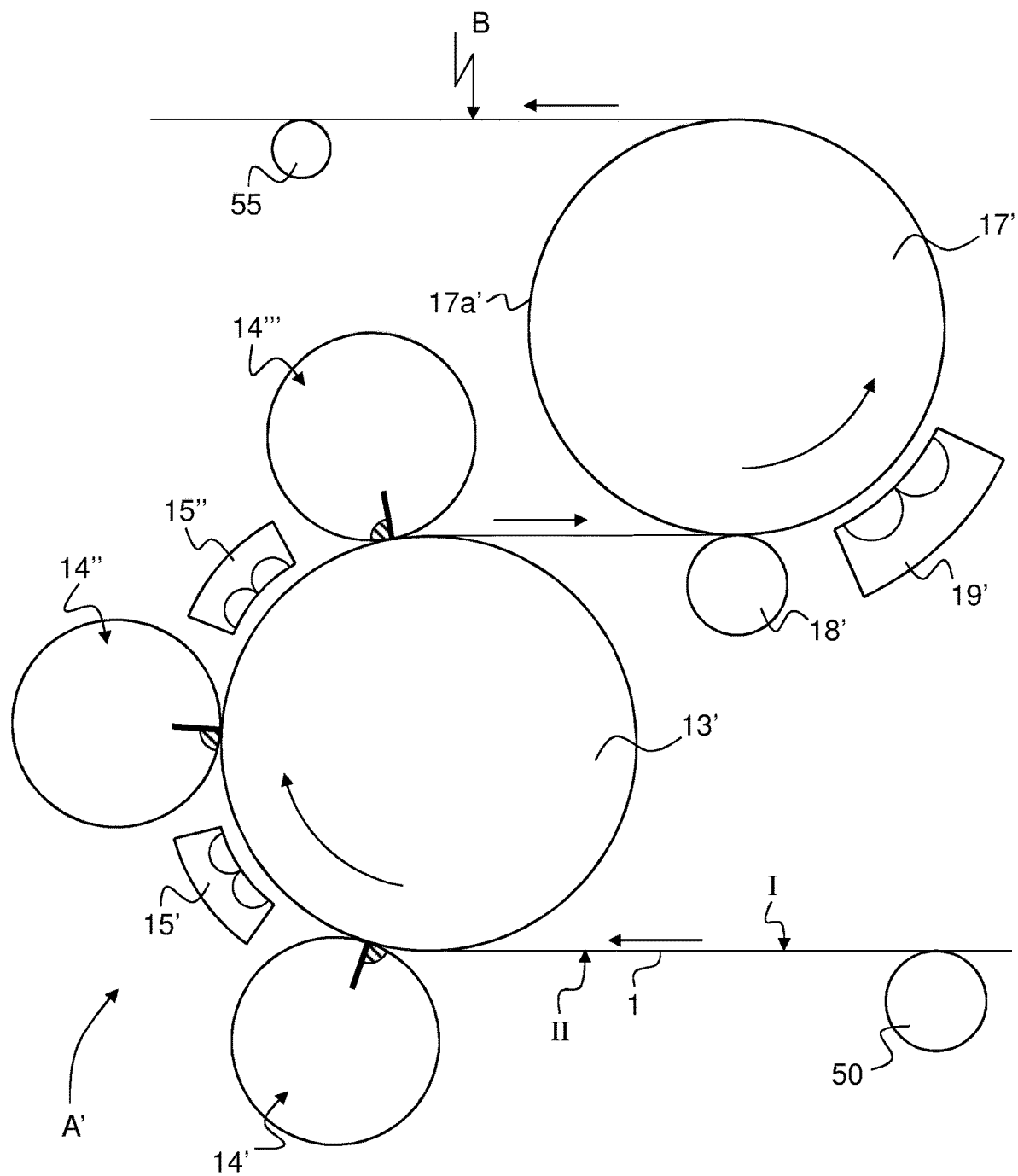
FIG. 4 is a schematic side view of a device designed to fill an opening formed into a security paper substrate with transparent polymer material, which opening is closed at one end by a transparent film that is laminated onto a first side of the security paper, in accordance with a second variant of the invention.

FIG. 4 is illustrative of a second variant of a device designed to fill the opening 10 formed into the security paper substrate 1 with transparent polymer material 2. This device can suitably be located downstream of a laminating system (not shown)—such as discussed e.g. in International (PCT) Publication No. WO 2008/104904 A1—that is designed to laminate the transparent film 5, respectively 5*, onto the first side I of the security paper substrate 1 in such a way as to close one end of the opening 10 formed in the security paper substrate 1 as discussed above.

The device of FIG. 4 is in particular designed to be located prior to cutting of the laminated film 5, respectively 5*. In FIG. 4, the laminated film 5, respectively 5*, is cut subsequent to the application of the transparent polymer material 2 into the opening 10 formed into the security paper substrate 1. Cutting of the laminated film is once again preferably carried out by means of a laser beam designated schematically by reference B in FIG. 4. In essence, cutting of the laminated film can again be carried out in accordance with the teaching of International (PCT) Publication No. WO 2010/001317 A1. Reference numeral 50 in FIG. 4 likewise schematically illustrates an output of the laminating system (upstream of the location where the laminated film 5, respectively 5*, is cut), while reference numeral 55 schematically illustrates an accelerating drum used to separate the sheets subsequent to the application of the transparent polymer material 2.

In contrast to the variant of FIG. 3, it should therefore be appreciated that the security paper substrate 1 is fed through the device while individual sheets of the security paper substrate 1 are still linked to one another by the transparent film that is laminated onto the security paper substrate 1. Sheets of security paper substrate 1 are separated at the downstream end of the device illustrated in FIG. 4.

Components 13', 14' (as well as 14" and 14'''), 17', 18', 19' have the same purpose as components 13, 14, 17, 18, 19 of FIG. 3.

In contrast to the device of FIG. 3, the application system A' of the device of FIG. 4 includes multiple application units 14', 14", 14''' (advantageously designed as screen-printing units) which are each adapted to apply a portion of the transparent polymer material 2 necessary to fill the opening 10. In this case, it may be appropriate to further provide intermediate UV-curing units 15', 15" between the first and second application units 14', 14" and between the second and third application units 14", 14'''.

Various modifications and/or improvements may be made to the above-described embodiments without departing from the scope of the invention as defined by the annexed claims.

In particular, it may be appropriate to further provide an additional application unit cooperating directly with the circumference of the second cylinder 17, 17' of FIGS. 3 and 4, upstream of the location where the security paper substrate 1 is contacting the second cylinder 17, 17' so as to apply a small amount of transparent polymer material 2 in the recessed portion of the lens replicating medium 17a, 17a'.

LIST OF REFERENCE NUMERALS USED THEREIN

1 security paper substrate
I first side of security paper substrate 1
II second side of security paper substrate 1, opposite to the first side I
T thickness of security paper substrate 1 (in the range of 60 to 120 μm)
W transparent polymer window formed in security paper substrate 1
L field of lenses formed onto window W (in register with opening 10)
$P_L$ lens pitch (spacing between adjacent lenses—preferably in the range of 10 to 50 μm)
$h_L$ lens height (preferably in the range of 10 to 20 μm)
2 transparent polymer material (in particular UV-curable polymer material) used to fill the opening 10 formed into the security paper substrate 1
5 transparent film laminated onto first side I of security paper substrate 1 (first embodiment—FIGS. 1A-D)/transparent film carrying field of lenses L
5\* transparent film laminated onto first side I of security paper substrate 1 (second embodiment—FIGS. 2A-E)
10 opening (through-hole) formed into thickness of security paper substrate 1
A application system (first variant—FIG. 3)
13 cylinder cooperating with application unit 14 and supporting first side I of security paper substrate 1 (first variant—FIG. 3)
14 application unit, in particular screen-printing unit (first variant—FIG. 3)
17 lens replicating cylinder (second cylinder) carrying at least one lens replicating medium 17a on its circumference and cooperating with the second side II of the security paper substrate 1 (first variant—FIG. 3)
17a lens replicating medium (e.g. lens replicating plate) carried by lens replicating cylinder 17
18 pressure roller cooperating with the first side I of the security paper substrate 1 and pressing the security paper substrate against the circumference of the lens replicating cylinder 17
19 UV-curing unit cooperating with the lens replicating cylinder 17 to cure the UV-curable polymer material 2 from the first side I of the security paper substrate 1, through the transparent film 5\*
A' application system (second variant—FIG. 4)
13' (first) cylinder cooperating with application units 14', 14", 14''' and supporting first side I of security paper substrate 1 (second variant—FIG. 4)
14' (first) application unit, in particular screen-printing unit (second variant—FIG. 4)
14" (second) application unit, in particular screen-printing unit (second variant—FIG. 4)
14''' (third) application unit, in particular screen-printing unit (second variant—FIG. 4)
15' intermediate UV-curing unit located between first and second application units 14', 14"
15" intermediate UV-curing unit located between second and third application units 14", 14'''
17' lens replicating cylinder (second cylinder) carrying at least one lens replicating medium 17a' on its circumference and cooperating with the second side II of the security paper substrate 1 (second variant—FIG. 4)
17a' lens replicating medium (e.g. lens replicating plate) carried by lens replicating cylinder 17'
18' pressure roller cooperating with the first side I of the security paper substrate 1 and pressing the security paper substrate against the circumference of the lens replicating cylinder 17'
19' UV-curing unit cooperating with the lens replicating cylinder 17' to cure the UV-curable polymer material 2 from the first side I of the security paper substrate 1, through the transparent film 5\*
50 output of film laminating machine (e.g. OptiNota® H machine with OptiWindows® module—see e.g. WO 2008/104904 A1, WO 2009/112989 A1 and WO 2010/001317 A1)
B laser beam for cutting laminated film (see e.g. WO 2008/104904 A1, WO 2009/112989 A1 and WO 2010/001317 A1)
55 accelerating drum for separating the sheets
60 sheet gripper system
61 chain wheel of sheet gripper system 60
62 endless chains of sheet gripper system 60

The invention claimed is:

1. A system comprising:
   a transparent film,
   a security paper substrate having an opening,
   a device designed to fill the opening in the security paper substrate with a transparent polymer material,
   wherein the opening is closed at one end by the transparent film that is laminated onto a first side of the security paper substrate,
   wherein the device comprises:
   an application system including:
   a first cylinder supporting the first side of the security paper substrate,
   at least a first application unit cooperating with a second side of the security paper substrate, opposite to the first side, to apply the transparent polymer material into the opening while the security paper substrate is being supported by the first cylinder, and
   a second cylinder located downstream of the first cylinder, which second cylinder cooperates with the second side of the security paper substrate and carries on its circumference a lens replicating medium designed to replicate a field of lenses into the transparent polymer material applied in the opening in such a way as to form lenses on the second side of the security paper substrate in register with the opening, wherein the transparent polymer material is a UV-curable polymer material, wherein the device further comprises a UV-curing unit cooperating with the second cylinder in order to cure the UV-curable polymer material from the first side of the security paper substrate, through the transparent film, whereby the device functions to fill the opening in the security paper substrate with the transparent polymer material.

2. The system according to claim 1, wherein the device further comprises a pressure roller cooperating with the first side of the security paper substrate and pressing the security paper substrate against the circumference of the second cylinder.

3. The system according to claim 1, wherein the application system of the device further includes at least a second application unit cooperating with the second side of the security paper substrate to apply the transparent polymer material into the opening while the security paper substrate is being supported by the first cylinder, and wherein each of the first and second application units applies a portion of the transparent polymer material necessary to fill the opening.

4. The system according to claim 3, wherein the transparent polymer material is a UV-curable polymer material, and the device further comprises at least one intermediate UV-curing unit located between the at least first and second application units.

5. The system according to claim 1, wherein each application unit is a screen-printing unit.

6. A processing machine comprising:
a laminating system designed to laminate a transparent film onto a first side of the security paper substrate in such a way as to close one end of an opening formed into a security paper substrate; and
a system in accordance with claim 1 designed to fill the opening with transparent polymer material.

* * * * *